United States Patent
Navarro-Sorroche et al.

(10) Patent No.: US 10,455,684 B2
(45) Date of Patent: Oct. 22, 2019

(54) FIELD-IONIZATION NEUTRON GENERATOR

(71) Applicant: Halliburton Energy Services, Inc., Houston, TX (US)

(72) Inventors: Juan Navarro-Sorroche, Plano, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/558,254

(22) PCT Filed: Apr. 16, 2015

(86) PCT No.: PCT/US2015/026193
§ 371 (c)(1),
(2) Date: Sep. 14, 2017

(87) PCT Pub. No.: WO2016/167774
PCT Pub. Date: Oct. 20, 2016

(65) Prior Publication Data
US 2018/0049305 A1    Feb. 15, 2018

(51) Int. Cl.
*H05H 3/06* (2006.01)
*G01V 5/10* (2006.01)
*H05H 6/00* (2006.01)

(52) U.S. Cl.
CPC ............ *H05H 3/06* (2013.01); *G01V 5/102* (2013.01); *H05H 6/00* (2013.01); *H05H 6/005* (2013.01)

(58) Field of Classification Search
CPC .. H05H 3/06; H05H 6/00; H05H 3/00; H05H 3/005; G01V 5/10; G01V 5/102; G01V 5/105; G01V 5/108; G21G 4/02; H01J 37/08; H01J 47/02; H01J 1/3044; H01J 2237/08; H01J 2237/082
USPC ...................................... 250/269.4
See application file for complete search history.

(56) References Cited

U.S. PATENT DOCUMENTS

| | | | | |
|---|---|---|---|---|
| 5,745,537 A | * | 4/1998 | Verschoore | H01J 27/04 376/108 |
| 6,188,746 B1 | * | 2/2001 | Miley | H05G 2/003 378/119 |
| 9,603,233 B2 | * | 3/2017 | Perkins | H05H 3/06 |

(Continued)

OTHER PUBLICATIONS

"International Application Serial No. PCT/US2015/026193, International Search Report dated Jan. 15, 2016", 3 pgs.

(Continued)

*Primary Examiner* — Taeho Jo
(74) *Attorney, Agent, or Firm* — Gilliam IP PLLC

(57) ABSTRACT

Described herein are neutron generators that employ direct field ionization of ionizable fusion gases, as well as well-logging tools and methods that utilize such neutron generators. In various embodiments, the neutron generator includes a cylindrical field-ionization structure distributed around the inner surface of a tubular housing, and a cylindrical ion-accelerating grid disposed about the longitudinal axis concentrically to the field-ionization structure. Ions generated by the field-ionization structure may accumulate inside the ion-accelerating grid, from which they can be axially extracted and accelerated towards a fusion target. Additional tools, systems, and methods are disclosed.

24 Claims, 5 Drawing Sheets

(56) References Cited

U.S. PATENT DOCUMENTS

| | | | |
|---|---|---|---|
| 2009/0135982 A1* | 5/2009 | Groves | H05H 3/06 376/113 |
| 2009/0146052 A1* | 6/2009 | Groves | G01V 5/10 250/269.4 |
| 2009/0262881 A1 | 10/2009 | Leung | |
| 2010/0193685 A1* | 8/2010 | Chu | H05H 3/06 250/306 |
| 2012/0049054 A1* | 3/2012 | Zhou | B82Y 15/00 250/265 |
| 2013/0068941 A1 | 3/2013 | Nikitin | |
| 2013/0168542 A1* | 7/2013 | Navarro-Sorroche | G01V 5/10 250/256 |
| 2013/0170592 A1* | 7/2013 | Zhou | H01J 27/02 376/114 |
| 2015/0155127 A1* | 6/2015 | Fink | H05H 3/06 250/427 |
| 2016/0216400 A1* | 7/2016 | Navarro-Sorroche | G01V 5/10 |
| 2016/0231457 A1* | 8/2016 | Navarro-Sorroche | E21B 47/011 |
| 2016/0295678 A1* | 10/2016 | Navarro-Sorroche | H05H 3/06 |

OTHER PUBLICATIONS

"International Application Serial No. PCT/US2015/026193, Written Opinion dated Jan. 15, 2016", 9 pgs.

Mexican Application Serial No. MX/a/2017/013279; First Office Action; dated Apr. 16, 2019, 6 pages.

\* cited by examiner

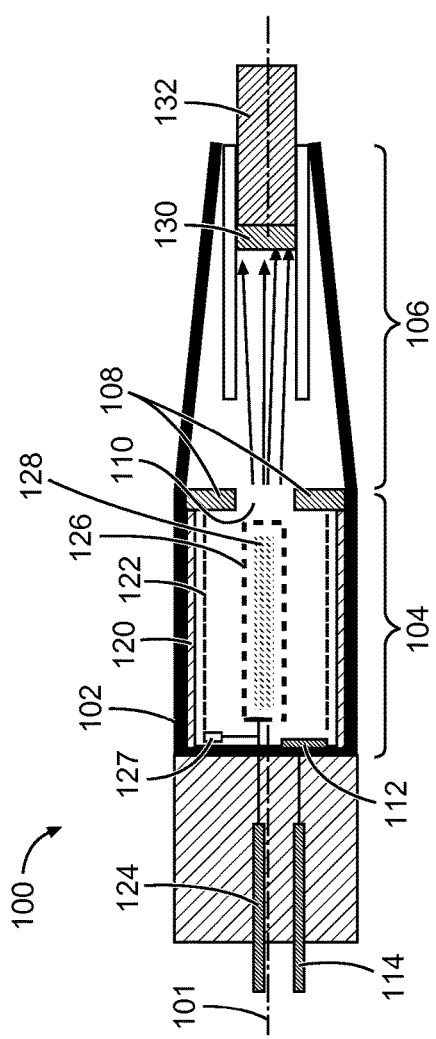
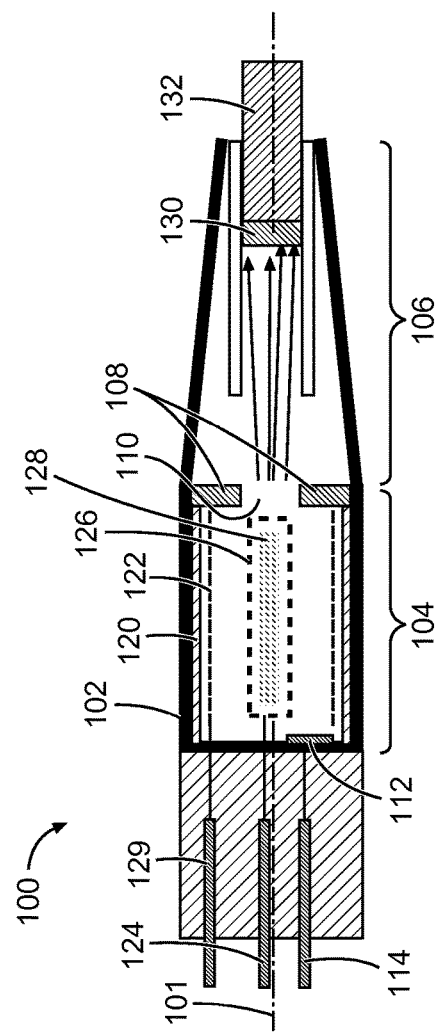
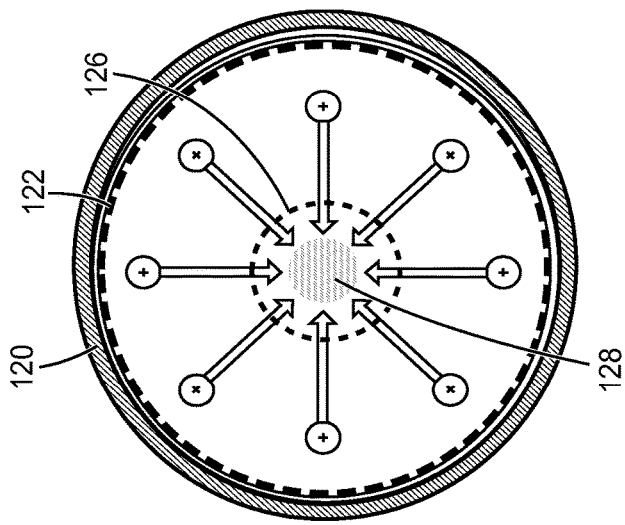

FIELD-IONIZATION NEUTRON GENERATOR

BACKGROUND

Pulsed neutron logging tools are routinely used in oil- and gas-well-logging operations to test the physical characteristics of subsurface formations penetrated by a wellbore. These tools generally include a neutron generator that produces bursts of high-energy neutrons, and one or more radiation detectors at selected distances from the neutron generator for measuring the secondary radiation (e.g., inelastic gamma rays, capture gamma rays, epithermal neutrons, or thermal neutrons) resulting from interactions of the high-energy neutrons with the materials in and around the borehole.

The high-energy neutrons can be generated in fusion reactions of the hydrogen isotopes deuterium and/or tritium. To cause fusion reactions, in turn, ionized deuterium and/or tritium gas may be accelerated by an ultra-high-voltage electrical field towards a deuterium- and/or tritium-containing target. The ions can be generated from neutral deuterium and/or tritium gas in various ways; most conventional pulsed neutron generators employ impact ionization by high-energy electrons. In a traditional Penning ion source, for instance, a high-voltage pulse (e.g., having an amplitude of a few kilovolts) is applied between a cathode and anode to create an arc discharge that causes electrons to be emitted from the cathode and accelerated towards the anode, colliding with and thereby ionizing gas molecules along the way. Alternative approaches to creating the requisite free electrons include thermal emission from heated cathodes in so-called "hot-cathode" ion sources, or field emission, i.e., tunneling of electrons through a potential barrier lowered by a very strong electrical field.

The indirect process of first creating electrons and then creating ions through electron collisions with neutral gas molecules generally results in a somewhat variable time delay of a few microseconds between the application of an electron-generating voltage pulse and the resulting neutron burst, rendering precise control over the timing of the neutron pulses difficult. Other characteristics of the neutron pulses, such as their shape and total neutron output, may likewise be less predictable or controllable than is desirable for the intended logging operations. Additional drawbacks of various conventional pulsed neutron generators include limited neutron output (which may be due, e.g., in Penning ion sources, to the fact that the majority of the ions are di-atomic); high ionization voltages, which may subject the neutron generator to electrical stresses that decrease its reliability and/or lifetime; and bulk and complexity resulting from additional ion-source components (such as, in Penning ion sources, a magnet used to lengthen the electron paths to thereby increase collision efficiency).

BRIEF DESCRIPTION OF THE DRAWINGS

FIGS. 1A and 1B are schematic longitudinal cross-sectional views of neutron generators employing field ionization in accordance with various embodiments.

FIG. 2 is a schematic transverse cross-sectional view of the ion source of the neutron-generator of FIGS. 1A and 1B.

DETAILED DESCRIPTION

Figure 3:
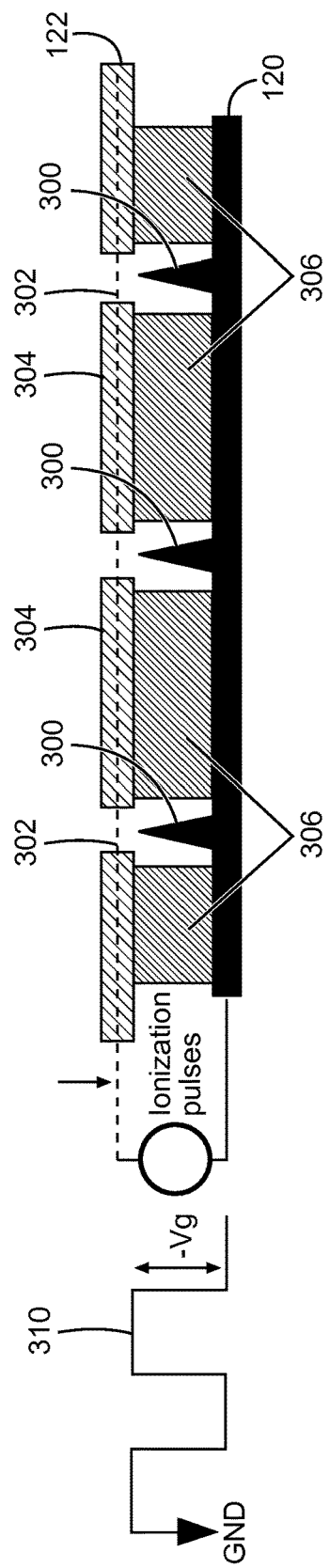
FIG. 3 is a diagram of an example field-ionization structure in accordance with various embodiments.

Described herein are neutron generators that employ direct field ionization of ionizable fusion gases. Also disclosed are pulsed neutron logging tools including, and methods of operating and using, such neutron generators. A neutron generator in accordance with various embodiments includes a tubular housing containing an ionizable fusion gas (e.g., deuterium and/or tritium) and defining ion-source and ion-acceleration portions. Within the ion-source portion, the neutron generator includes a cylindrical field-ionization structure distributed around the inner surface of the tubular housing. The field-ionization structure may include a field-ionization array of nanotips extending inwardly from a cylindrical substrate, and a cylindrical field-ionization grid disposed concentrically to the substrate at a small distance (e.g., ten micrometers or less) therefrom. Neutral fusion gas can be ionized in the field-ionization structure by applying a suitable negative electrical potential (or voltage) to the field-ionization grid (relative to the array of nanotips). In accordance with various embodiments, the neutron generator further includes a cylindrical, high-transparency ion-accelerating grid disposed about the longitudinal axis of the neutron generator concentrically to the field-ionization structure, and held at a negative electrical potential relative to the field-ionization grid. Ions generated by the field-ionization structure accumulate inside the ion-acceleration grid, from which they can be axially extracted and accelerated, inside the ion-acceleration portion of the neutron generator, towards a fusion target. The term "cylindrical," as used herein, refers to the general shape of the respective component (not taking small surface features into account), and does not require perfect, but merely "substantial" cylindrical geometry. A structure is deemed "substantially cylindrical" (herein simply "cylindrical") if the radial distances of any point thereon from the cylinder axis vary by less than 20%. Variations from the cylinder radius may result, e.g., by approximating a perfectly cylindrical shape with a plurality of planar segments or strips.

Beneficially, by using direct field ionization (as opposed to impact ionization), the "ion-source ignition time," i.e., the time delay between application of a voltage pulse to the field-ionization structure and the creation of a fusion-neutron pulse can be reduced, in various embodiments, to sub-microseconds. The ability to control neutron pulse characteristics may thereby be greatly enhanced. Furthermore, the ionization voltage (which, in ion source configurations in accordance herewith, corresponds to the voltage applied between the field-ionization array and the field-ionization grid) may be on the order of only a few hundred Volts, which corresponds to an ionization-voltage reduction, compared with various conventional neutron generators (such as those using Penning ion sources), of approximately an order of magnitude. The reduced voltage may contribute to increased reliability and operational lifetime of the neutron generator.

Another benefit of neutron generators in accordance herewith is their ability to achieve, in various embodiments, ion populations with more than 50% monatomic ions. Compared with diatomic ions, monatomic ions achieve about twice the energy per nucleus, resulting in an approximately five times higher associated fusion cross-section. Thus, a predominantly monatomic ion population can result in significantly higher neutron yields. Neutron generators in accordance with certain embodiments yield $10^9$ fusion neutrons per second or more—about an order of magnitude above the neutron yields achievable with many conventional neutron generators (such as those utilizing Penning ion sources). Higher neutron yields may contribute to an increased lifetime and reliability of the neutron generator, and provide better signal strengths for pulsed neutron measurements. Moreover, they may provide sufficient numbers of 2.45 MeV neutrons resulting from deuterium-deuterium fusion to render measurements based thereon feasible; this is advantageous because 2.45 MeV neutrons are more suited to the measurement of certain formation properties than the 14.1 MeV neutrons created during deuterium-tritium fusion reactions.

Example embodiments of field-ionization-based neutron generators will now be described in more detail with reference to the accompanying drawings. As will be readily apparent to those of ordinary skill in the art having the benefit of the present disclosure, various structural and operational changes to the specific embodiments discussed may be made without departing from the scope of this disclosure.

FIG. 1A illustrates a neutron generator 100, in accordance with one embodiment, in a cross-sectional view taken along a longitudinal axis 101 of the device. The neutron generator 100 includes a closed (usually hermetically sealed) tubular housing 102 defining a vacuum chamber for containing an ionizable fusion gas, such as, e.g., deuterium gas, tritium gas, or a mixture thereof. (The interior of the housing 102 is herein referred to as a "vacuum chamber" because gas pressures therein are, in an operational device, generally significantly below atmospheric pressure.) The housing 102 may be made of a suitable metal or metal alloy, such as, for example, F15 (a nickel-cobalt-iron alloy) or Kovar (an iron-nickel alloy). It may be (and is for purposes of the following discussion assumed to be) grounded, i.e., held at an electrical potential of zero Volts. As illustrated, the housing 102 may include, along the longitudinal axis 101, a cylindrical section defining an ion-source portion 104 of the neutron generator 100, and a frustoconical section defining an ion-acceleration portion 106 of the neutron generator 100. The two portions 104, 106 may be physically separated by an ion-source cover 108 that defines an ion-extraction aperture 110 centered at the longitudinal axis 101. In various embodiments, the outer diameter of the housing 102 is less than about 1.5" (e.g., about 1.3" in accordance with certain industry standards). The small diameter facilitate use of the neutron generator 100 in typical borehole environments, where the outer diameter of a tool, including its pressure housing, may be confined to about 2" or less (e.g., about 1.7" in certain standard tool configurations). The length (i.e., longitudinal dimension) of the housing 102 may be several inches.

The ion-source portion 104 includes a gas-reservoir element 112 comprising a metal (or metal-alloy) filament coated with a material (e.g., another metal) that has deuterium and/or tritium molecules adsorbed thereto. For example, in some embodiments, the gas-reservoir element 112 is a titanium-coated tungsten filament. The gas-reservoir element 112 can be heated by causing an electrical current to flow through the filament. The current may be supplied, e.g., via a gas-reservoir-element control electrode 114 held at a positive or negative voltage relative to the (grounded) housing 102, which may be in electrical contact with the gas-reservoir element 112 so as to provide the second electrode. As the temperature of the gas-reservoir element 112 increases, adsorbed deuterium/tritium gas is released into the vacuum chamber. Conversely, as the gas-reservoir element 112 cools down, deuterium/tritium gas is (re-) adsorbed by the filament coating. The equilibrium gas pressure established inside the vacuum chamber depends on the temperature of the gas-reservoir element 112, and can thus be regulated via the electrical current supplied to the gas-reservoir element 112. The working gas pressure used during operation of the neutron generator 100 may be, e.g., on the order of 1 mTorr (i.e., significantly below atmospheric pressure).

The ion-source portion 104 of the neutron generator 100 further includes a cylindrical field-ionization structure arranged along an inner surface of the housing 102; in FIG. 2, this structure is shown in a transverse cross-sectional view (i.e., a cross-section taken perpendicularly to the longitudinal axis 101 through the ion-source portion 104). The field-ionization structure includes a field-ionization array 120—that is, an array of inward-pointing nanotips disposed on a cylindrical electrically conductive substrate (shown in more detail in FIG. 3)—and a cylindrical electrically conductive field-ionization grid 122 disposed interior and concentrically to the field-ionization array 120. In some embodiments, the radial distance between the array 120 and grid 122 is less than one micrometer, in certain embodiments even less than five hundred nanometers. Upon application of a negative electrical potential to the field-ionization grid 122 (supplied, e.g., via an ion-source electrode 124, shown in FIG. 1A), relative to the field-ionization array 120 (which may be grounded, e.g., via an electrical connection to the housing 102), gas molecules in the vicinity of the nanotips are ionized.

The rate with which the gas is ionized, and thus the ion currents generated by the ion-source portion 104, is generally proportional to the surface area of the field-ionization array 120. Beneficially, the radial configuration of cylindrical field-ionization structures in accordance herewith increases the surface area of the field-ionization array compared with that of a linear arrangement (as conventionally used in the laboratory or other contexts where the spatial confines imposed by the well-logging industry do not apply) including planar circular field-ionization arrays and grids sized to fit within a tool suitable for well-logging applications. For example, an ion-source portion 104 with a diameter d and a length/can accommodate a cylindrical field-ionization array having an area of at most $A_{cyl}=\pi \cdot d \cdot l$ or a planar circular field-ionization array (oriented perpendicular to the longitudinal axis) of at most $A_{plan}=\pi/4 \cdot d^2$. With example dimensions of d=1.25" (which is suitable to fit within a housing having an outer diameter of 1.5") and l=2.5", the area of the cylindrical field-ionization array exceeds that of the planar array by $A_{cyl}/A_{plan}=4 \cdot l/d \approx 8$. If a larger field-ionization array is desirable to produce higher ion currents, the length of the cylindrical array may be further increased. The size of a circular array, by contrast, is usually much more limited, due to the spatial confines of the well-logging tool. Accordingly, the cylindrical geometry of field-ionization structures as described herein can contribute to attaining neutron yields sufficiently high for well-logging operations, thereby rendering neutron generation based on direct field ionization feasible.

Still referring to FIG. 1A, the ionized gas may be accelerated towards the radial center of the vacuum chamber by a cylindrical ion-accelerating grid 126 disposed about the longitudinal axis 101 and held at a negative electrical potential relative to the field-ionization grid 122. In some embodiments, as shown in FIG. 1A, the accelerating grid 126 is connected to the same ion-source electrode 124 that also supplies a voltage to the field-ionization grid 122, but a bias resistor 127 connected in series with the field-ionization grid creates a voltage difference (e.g., of about 100 V) between the field-ionization grid 122 and the ion-accelerating grid 126. In alternative embodiments, depicted in FIG. 1B, a separate electrode 129 is used to connect the ion-accelerating grid 126 independently from the field-ionization grid 122. The accelerating grid 126 is highly transparent (occluding with its meshes, e.g., only 10% or less of the cylindrical surface it defines), allowing the ions to oscillate across the vacuum chamber and to eventually accumulate in the cylindrical cavity defined by the accelerating grid 126, forming an electrically charged plasma 128 therein. The ions can be axially extracted from this plasma region through the extraction aperture 110. The diameter of the accelerating grid 126 may be about a quarter inch; in some embodiments, it matches the diameter of the aperture 110.

The ion-acceleration portion 106 of the neutron generator 100 includes, at the end opposite the ion-source cover 108 (and, thus, distal to the ion-source portion), the fusion target 130, e.g., in the form of a layer of titanium (or another suitable metal) impregnated with deuterium and/or tritium (the "target atoms"), which is disposed on a target rod 132 (which may be made, e.g., of copper). Together, the target rod 132 and the deuterium/tritium-containing layer disposed thereon are referred to as the target cathode. An ultra-high negative voltage, e.g., on the order of (minus) 100 keV, is applied between the target cathode and the ion source (e.g., the ion-accelerating grid 126), creating a strong axial electrical field that extracts the positive ions from the cavity of the accelerating grid 126 and accelerates them towards the target 130. Upon impact with the target 130, a portion of the ions undergoes fusion reactions with the deuterium and/or tritium atoms in the target 130, creating fast neutrons (e.g., 14.1 MeV neutrons from the fusion of a deuterium nucleus with a tritium nucleus, or 2.45 MeV neutrons from the fusion of two deuterium nuclei) in the process. Suitable structural and operational parameters of the ion-accelerating portion 106 of the neutron generator 100 (including dimensions, materials, and voltages) are well-known to those of ordinary skill in the art.

With reference to FIG. 3, example field-ionization structures will now be described. In general, a field-ionization structure in accordance herewith includes a substrate 120 and, extending therefrom, a plurality of nanotips 300, arranged, e.g., in a regular array. In accordance with various embodiments, the term "nanotip" herein refers to structures with largest dimensions not exceeding one micrometer. In some embodiments, the largest dimension of the nanotips does not exceed 500 nanometers; for example, the size of the nanotips may fall within the range from about 200 nanometers to about 300 nanometers. The substrate 120 may be made of any of a variety of suitable semiconductor or conductor materials (e.g., silicon, silicon oxide, aluminum oxide, gallium arsenide, a nickel-based material, etc.). The nanotips 300 may be made of, for example and without limitation, silicon, carbon, tungsten, molybdenum, chromium, aluminum nitride, or combinations thereof. For instance, in some embodiments, the nanotips each include a tungsten base tip attached to the substrate and a carbon tip molecularly formed on the end of the tungsten tip. The nanotips 300 may be substantially conical (as shown), or have any of a variety of other geometric shapes. For example, in some embodiments, the nanotips are substantially cylindrical carbon nanotubes. The array may include on the order of a million nanotips per square centimeter. The size, aspect ratio, and density of the nanotips may depend on the particular manufacturing method employed.

The field-ionization structure further includes a field-ionization grid 122 disposed above the nanotip array. Openings 302 of the grid 122 are generally aligned with the nanotips 300. For example, as illustrated in FIG. 3, the grid 122 may be formed of an array of gate electrodes 304 interspaced between the nanotips 300 and spaced and isolated from the substrate by insulators 306. The height of the nanotips 300 may be slightly larger than, equal to, or smaller than the distance between the substrate 120 and the field-ionization grid 122, such that the nanotips 300 penetrate the grid 122 or, alternatively, end at the plane of or below the field-ionization grid 122 (as shown). The spacing between the nanotips 300 and the gate electrodes 304 may be selected such that ionization-voltage pulses applied therebetween (indicated at 310) act to ionize gas in the space surrounding the nanotips 300.

Field-ionization arrays and grids 120, 122 are structurally similar to field-emission grids, the primary (or in some cases only) difference being a reversed polarity between the array 120 and grid 122: while, in field-emission structures, the grid 122 is held at a positive voltage relative to the nanotips 300 to cause electrons to tunnel from the nanotips 300 through the decreased potential barrier into the vacuum, field-ionization structures employ a negative voltage of the grid 122 to cause electrons to tunnel from neutral particles (e.g., gas molecules) in the vicinity of the tips 300 to the tips 300, thereby creating ions. The threshold nominal electrical field strength (i.e., the threshold ratio of the applied voltage to the distance between the substrate 120 and grid 122) needed in the field-ionization structure to generate a substantial ion current at a tip 300 depends, among other things, on the geometry and material of the nanotip 300, and may be higher by a factor of about three to seven than the electrical field strength needed to generate the same electrical current with electrons generated by field emission. (This is due to the fact that the surface potential of typical materials ranges from 2 to 5 eV, whereas the ionization potential of hydrogen is about 13.5 eV—about three to seven times higher.). For example, for carbon nanotubes, field-ionization thresholds may be between about 7.5 and 16 V/$\mu$m (as compared with 0.75-1.6 V/$\mu$m for field emissions), whereas, for silicon, aluminum-nitride, tungsten, and molybdenum nanotips, field-ionization thresholds may be between about 20 and about 40 or 50 V/$\mu$m. Note that the actual local field strengths in the vicinity of the nanotips are much higher than the nominal field strength, due to the small dimensions of the nanotips (especially at their upper, free ends).

Field-ionization arrays and grids suitable for use in neutron generators as contemplated herein, and methods of their manufacture, are generally well-known to those of ordinary skill in the art. In accordance herewith, however, the field-ionization structure is cylindrical (and not, as most conventional structures, planar). In some embodiments, a cylindrical field-ionization structure (or a component thereof, such as the field-ionization array) is assembled from a plurality of planar strips that are attached around the interior surface of the housing 102 parallel to the longitudinal axis 101. In other embodiments, a cylindrical field-ionization structure (or its constituent components, such as the array 120 and grid 122) is formed as a whole, e.g., integrally with the housing 102 or as a separate, self-supporting structure insertable into the housing 102.

Figure 4:
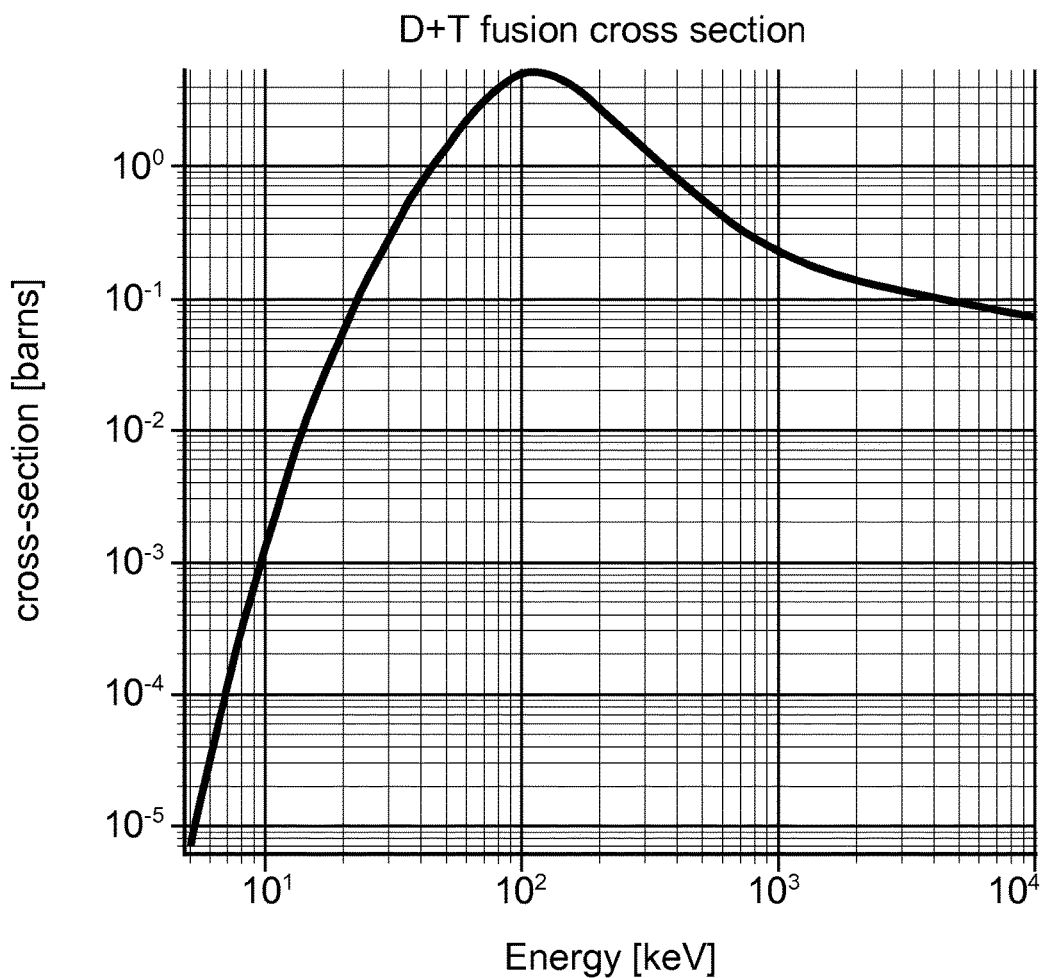
FIG. 4 is a graph of the deuterium-tritium fusion cross-section as a function of the energy per nucleus of the incident ion.

Neutron generators in accordance herewith may provide various advantageous performance characteristics or other beneficial properties. For example, in some embodiments, the ion source of the neutron generator produces (as a result of employing direct field ionization) deuterium and/or tritium ions that are largely (e.g., to more than 50%, in some embodiments to more than 75% or even to more than 90%) monatomic. FIG. 4 shows the fusion cross-sections for deuterium-tritium fusion reactions as a function of the energy per nucleus of the incident ion. For an incident diatomic deuterium ion, the energy per nucleus is only half of the energy of a monatomic deuterium ion (because the energy to which the diatomic ion is accelerated between the extraction aperture 110 and the fusion target 130, which is the same as for a monatomic ion, is split between the two nuclei). Thus, in an electrical field in which monatomic ions are accelerated to an energy of about 110 keV, where the fusion cross-section peaks at about five barns (as shown in FIG. 4), the individual nuclei of diatomic ions reach energies of only about 55 keV, reducing their fusion cross-section to about 0.8 barns. Accordingly, the fusion cross-section of monoatomic ions is by about a factor of five or six higher than that of diatomic ions. Since the probability that fusion occurs upon impact of a deuterium or tritium ion on the target is proportional to the fusion cross-section, the higher fusion cross-section translates, for a given ion beam current incident on the target, into a correspondingly higher number of fusion reactions and, thus, of neutrons generated. Another factor contributing, in various embodiments, to increased neutron yields is the cylindrical configuration of the field-ionization array, which results in a larger surface area (compared with planar field-ionization configurations) and, thus, higher ion beam currents. In some embodiments, the neutron generator achieves neutron yields, for 14.1 MeV neutrons generated during deuterium-tritium fusion, of about $10^9$ neutrons per second or more. For comparison, many conventional neutron generators employed in well-logging tools reach only about $10^8$ neutrons per second. Since the neutron yield for deuterium-deuterium fusion is about two orders of magnitude lower than that for deuterium-tritium fusion, such conventional neutron generators generally do not produce sufficient numbers of the 2.45 MeV neutrons generated from deuterium-deuterium to be useful for measurements. The significantly higher neutron yields provided by various embodiments of the disclosed neutron generator, however, may render measurements using the 2.45 MeV neutrons feasible. This is beneficial because neutrons in the 2.45 MeV energy range provide a better interacting tool for measuring certain formation properties, such as hydrogen index and formation porosity.

Another advantage of neutron generators in accordance herewith is the significantly decreased ion-source ignition time. In many conventional neutron generators, the time delay between the application of an ionization voltage and the generation of neutrons (the "turn-on" time), or between the removal of the ionization voltage and the cessation of neutron generation (the "turn-off" time), is approximately ten microseconds. By contrast, the field-ionization-based neutron generators described herein may have turn-on/turn-off times in the nanoseconds range (i.e., below 1 µs). This is beneficial for pulsed neutron logging tools, as it provides better control over and/or knowledge of the timing and shape of the neutron pulses (facilitating, e.g., the creation of substantially square-shaped neutron pulses with short rise and fall times).

Further beneficial characteristics of neutron generators in accordance with various embodiments include the relatively low ionization voltages (of, e.g., a few hundred Volts, rather than a few kilovolts as used in Penning ion sources, among others), and certain structural simplicity compared with many conventional devices. For example, Penning ion sources generally utilize a magnetic field to lengthen the electron paths in the ion source; this makes use of either a permanent magnet, which adds bulk and provides manufacturing challenges due to the fact that the magnetic field strength tends to degrade at the high temperatures generally used for out-gassing the vacuum chamber, or a solenoid, with additional electrical connections and circuitry. Employing direct field ionization in accordance herewith dispenses with using this type of permanent or electromagnetic magnet.

Figure 5:
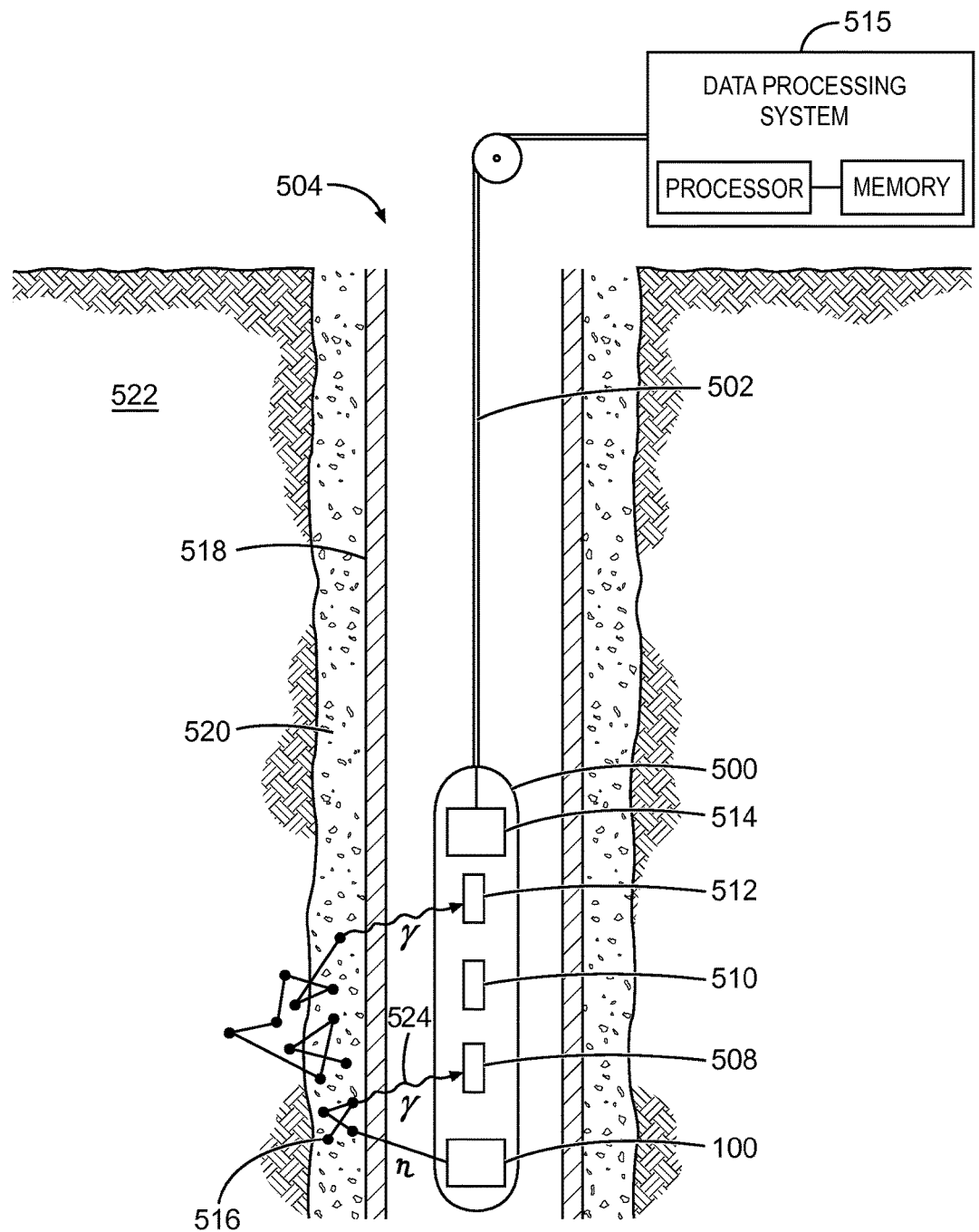
FIG. 5 is a diagram of a pulsed neutron tool deployed in a borehole, in accordance with various embodiments.

Field-ionization-based neutron generators as described above can be used with suitable radiation detectors and control and processing circuitry to provide pulsed neutron logging tools for use in various well-logging operations. FIG. 5 illustrates a pulsed neutron well-logging tool 500 in accordance with various embodiments in one context in which it may be employed, namely, suspended from a wireline 502 inside a cased borehole 504. Although not depicted, in alternative embodiments, the tool 500 may be conveyed downhole as part of a drill string, e.g. within a bottom hole assembly, during a logging-while-drilling (LWD) or measurement-while-drilling (MWD) operation. The well-logging tool 500 may include a neutron generator 100 as described above, and one or more radiation detectors. For example, certain tools utilize three gamma detectors 508, 510, 512 in a linear configuration. The well-logging tool 500 may further include control and processing circuitry 514 configured to control operation of the tool 500 and/or process data obtained therewith (such as data indicative of radiation measured by the detectors). The control and processing circuitry 514 may be in communication via one or more telemetry systems with a data processing system 515 (including, e.g., a processor and memory) located above surface, where measurements taken by the tool 500 may be further processed, displayed, and/or logged.

The neutron generator 100 may be operated to create pulses of high-energy neutrons 516 (e.g., with energies of 2.45 MeV or 14.1 MeV). These high-energy neutrons 516 generally penetrate the metal case of the well-logging tool 500 as well as the borehole casing 518, but are slowed down in the cement sheath 520 of the borehole or the formation 522 surrounding the borehole by repeatedly scattering off and eventually being captured by nuclei in these materials, creating gamma radiation 524 in the process. The gamma detectors 508, 510, 512 serve to detect and quantify the gamma radiation, thereby capture information about the density and other properties of the materials. The use of multiple detectors at different distances from the neutron generator 100 may serve to probe different radial depths within the materials and/or to normalize for certain quantities (e.g., total neutron count) by forming ratios between the readings from different detectors. Alternatively or additionally to gamma detectors, the well-logging tool 500 may include one or more detectors for measuring secondary neutrons generated during interactions of the fusion neutrons with the borehole or formation. The control and processing circuitry 514 and/or the data-processing system 515 may correlate the measured radiation pulses with the neutron pulses that cause them; improved control over neutron pulse timing, as achieved in accordance with various embodiments due to shorter ion-source ignition times, is beneficial for this purpose.

To use the well-logging tool 500 in an MWD operation, the neutron generator 100, detectors 508, 510, 512, and control and processing circuitry 514 may be mounted in the bottom hole assembly of a drill string, e.g., housed within or integrated with a drill-collar section to form a separate sub. Instead of being suspended from a wireline, the tool 500 will then be moved into and out of the borehole along with the drill string. In this configuration, the linear arrangement of the neutron generator 100 and detectors 508, 510, 512 as depicted in FIG. 5 may be retained. The tool 500 generally functions in the same manner regardless whether it is deployed in a wireline sonde (as shown in FIG. 5) or as an MWD tool in a bottom hole assembly.

Figure 6:
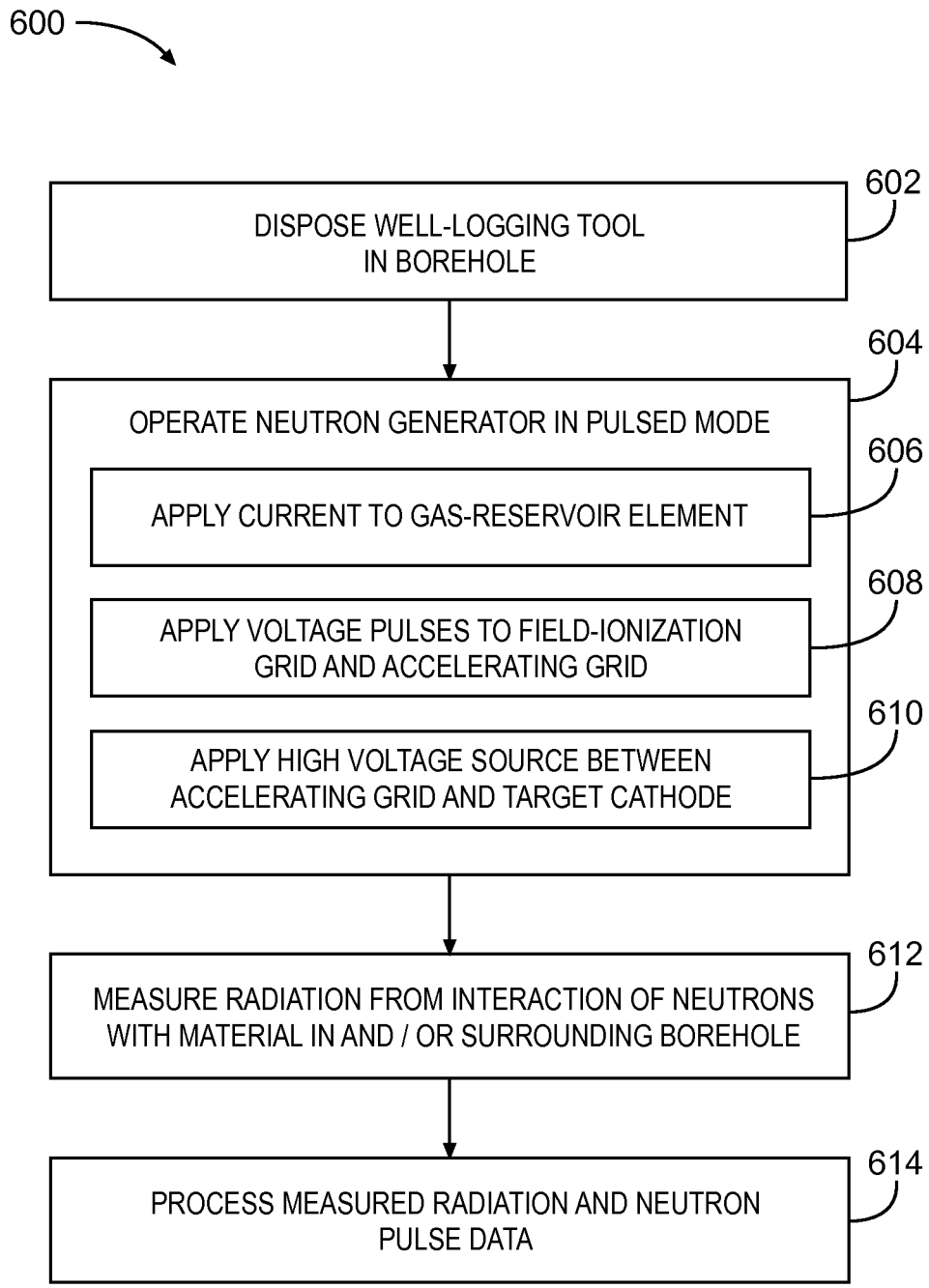
FIG. 6 is a flow chart of a method of using a pulsed neutron logging tool, in accordance with various embodiments.

FIG. 6 illustrates, in the form of a flow chart, a method 600 of using a well-logging tool in accordance herewith. The method 600 includes disposing a pulsed neutron well-logging tool in accordance with the present disclosure (e.g., tool 500 including a neutron generator 100) into a borehole (operation 602), e.g., by lowering the tool into the borehole on a wireline (as depicted in FIG. 5) or as part of a tool string during an MWD operation. Once located at the desired depth within the borehole, the neutron generator may be operated in a pulsed mode to generate neutron bursts (operation 604). Operating the neutron generator generally involves applying a current to the gas-reservoir element to create a desired operating pressure of fusion gases (operation 606); applying a pulsed voltage of the proper polarity to the field-ionization structure and the accelerating grid (for instance, by applying negative voltage pulses to the field-ionization grid (via a bias resistor) and the accelerating grid and holding the field-ionization array at zero Volts) (operation 608); and applying an ultra-high voltage between the ion source (e.g., the accelerating grid) and the target cathode (operation 610). The method further includes measuring radiation resulting from interaction of the neutrons with materials in or surrounding the borehole (operation 612), using one or more suitable radiation detectors of the well-logging tool. The measured radiation data may then be processed in conjunction with neutron pulse data, taking into account the timing between neutron pulses (as can be determined based on the timing of the voltage pulses) and the detected radiation, to obtain information about the borehole and/or formation properties (operation 614).

Many variations may be made in the structures and techniques described and illustrated herein without departing from the scope of the inventive subject matter. Accordingly, the described embodiments are not intended to limit the scope of the inventive subject matter. Rather, the scope of the inventive subject matter is to be determined by the scope of the following claims and all additional claims supported by the present disclosure, and all equivalents of such claims.

The invention claimed is:

1. A neutron generator comprising:
a closed housing containing an ionizable gas, the closed housing defining a first portion and a second portion along a longitudinal axis thereof;
a field-ionization structure arranged along an inner surface of the closed housing in the first portion, wherein application of an electrical voltage to the field-ionization structure ionizes the ionizable gas, wherein the field-ionization structure comprises an array of nanotips disposed on a cylindrical substrate and a field-ionization grid disposed concentrically interior to the cylindrical substrate, and wherein a set of nanotips of the array of nanotips are located at openings in the field-ionization grid and aligned with the field-ionization grid;
a cylindrical accelerating grid placed about the longitudinal axis in the first portion, wherein holding the cylindrical accelerating grid at a first negative electric potential relative to the field-ionization grid causes accumulation of ions in the grid; and
a target cathode disposed at an end of the second portion that is distal to the first portion, wherein holding the target cathode at a second negative electrical potential relative to the cylindrical accelerating grid extracts ions from the cylindrical accelerating grid and accelerates them towards the target cathode to thereby cause fusion reactions between the ions and target atoms contained in the target cathode.

2. The neutron generator of claim 1, wherein a distance between the cylindrical substrate and the field-ionization grid is smaller than one micrometer.

3. The neutron generator of claim 1, wherein the closed housing has an outer diameter of less than 1.5 inches.

4. The neutron generator of claim 3, capable of achieving a neutron yield from the fusion reactions of at least $10^9$ neutrons per second.

5. The neutron generator of claim 1, wherein the field-ionization structure is to produce ionized gas having at least 50% monatomic ions.

6. The neutron generator of claim 1, wherein application of a voltage pulse to the field-ionization structure creates a fusion-neutron pulse within less than one microsecond thereafter.

7. The neutron generator of claim 1, wherein the ionizable gas comprises at least one of deuterium and tritium.

8. The neutron generator of claim 1, wherein an absolute value of the first negative electric potential is about 100 Volts.

9. The neutron generator of claim 1, wherein the nanotips point inward towards the center of a cylinder formed by the cylindrical substrate.

10. The neutron generator of claim 1, wherein the field-ionization structure is axially positioned with respect to the target cathode.

11. A tool comprising:
a neutron generator comprising, contained within a closed housing defining a first portion and a second portion along a longitudinal axis thereof:
a field-ionization structure arranged along an inner surface of the closed housing in the first portion, wherein application of an electrical voltage on the field-ionization structure ionizes an ionizable gas contained within the closed housing, wherein the field-ionization structure comprises an array of nanotips disposed on a cylindrical substrate and a field-ionization grid disposed concentrically interior to the cylindrical substrate, and wherein a set of nanotips of the array of nanotips are located at openings in the field-ionization grid and aligned with the field-ionization grid;
a cylindrical accelerating grid placed about the longitudinal axis in the first portion, wherein holding the cylindrical accelerating grid at a first negative electric potential relative to the field-ionization grid causes accumulation of ions in the grid;
a target cathode disposed at an end of the second portion that is distal to the first portion, wherein holding the target cathode at a second negative electrical potential relative to the cylindrical accelerating grid extracts ions from the cylindrical accelerating grid and accelerates them towards the target cathode, and wherein fusion reactions between the ions and target atoms contained in the target cathode generates neutrons; and a radiation detector to detect radiation resulting from interaction of the neutrons with materials outside the tool.

12. The tool of claim 11, further comprising circuitry to perform operations comprising at least one of controlling operation of the neutron generator or the radiation detector, or processing data indicative of the radiation detected by the radiation detector.

13. The tool of claim 11, wherein a diameter of the tool is less than two inches.

14. The tool of claim 13, wherein an outer diameter of the neutron generator is less than 1.5 inches.

15. The tool of claim 14, wherein the neutron generator is capable of achieving a neutron yield from the fusion reactions of at least $10^9$ neutrons per second.

16. The tool of claim 11, wherein the field-ionization structure is to produce, when operating, ionized gas having at least 50% monatomic ions.

17. The tool of claim 11, wherein the neutron generator is to cause creation of a fusion-neutron pulse within less than one microsecond following application of a voltage pulse to the field-ionization structure.

18. The tool of claim 11, wherein an absolute value of the first negative electric potential is about 100 Volts.

19. A method comprising:

disposing a tool in a borehole, the tool comprising a neutron generator that comprises:

a closed housing containing an ionizable gas, the closed housing defining a first portion and a second portion along a longitudinal axis thereof;

a cylindrical field-ionization structure, arranged along an inner surface of the closed housing in the first portion, for ionizing the ionizable gas upon application of an electrical voltage thereto, wherein the field-ionization structure comprises an array of nanotips disposed on a cylindrical substrate and a field-ionization grid disposed concentrically interior to the cylindrical substrate, and wherein a set of nanotips of the array of nanotips are located at openings in the field-ionization grid and aligned with the field-ionization grid;

a cylindrical accelerating grid, placed about the longitudinal axis in the first portion, wherein ions accumulate in the cylindrical accelerating grid when the cylindrical accelerating grid is held at a first negative electric potential relative to the field-ionization grid; and a target cathode, disposed at an end of the second portion that is distal to the first portion, wherein holding the target cathode at a negative electrical potential relative to the cylindrical accelerating grid extracts ions from the cylindrical accelerating grid and accelerates them towards the target cathode to thereby cause fusion reactions between the ions and target atoms contained in the target cathode; and operating the neutron generator in a pulsed mode to generate neutron pulses by fusion of the ionized gas with the target atoms.

20. The method of claim 19, wherein operating the neutron generator comprises applying a pulsed voltage to the cylindrical field-ionization structure.

21. The method of claim 20, wherein the pulsed voltage is less than one thousand Volts.

22. The method of claim 19, further comprising measuring radiation resulting from interactions of neutrons with materials in or surrounding the borehole.

23. The method of claim 19, wherein disposing the tool in the borehole comprises suspending the tool from a wireline.

24. The method of claim 19, wherein disposing the tool in the borehole comprises disposing a drill string including the tool in the borehole.

* * * * *